United States Patent Office 3,375,258
Patented Mar. 26, 1968

3,375,258
PREPARATION OF 2-BENZOYLMETHYL-
BENZOXAZOLES
Emil B. Rauch, Port Dickinson, and John A. Welsh, Binghamton, N.Y., assignors to General Aniline & Film Corporation, New York, N.Y., a corporation of Delaware
No Drawing. Filed Jan. 18, 1965, Ser. No. 426,387
10 Claims. (Cl. 260—307)

This invention relates to the preparation of 2-phenacyloxazoles. More particularly, this invention relates to a process of preparing 2-phenacylbenzoxazoles which comprises reacting an alkyl ester of an aromatic carboxylic acid with a 2-methylbenzoxazole in the presence of an alkali metal hydride catalyst.

Various methods have been suggested and tried with varying degrees of success for the preparation of 2-phenacylbenzoxazole, the lowest number of the 2-phenacyloxazole series, which series has the structure

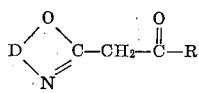

wherein R is a monovalent aryl group and D is a divalent ortho-arylene group. These techniques have been time consuming multi-step processes and/or resulted in low yields of the desired products. For example, Stachel discloses in Arch. Phrm. No. 296, 337 to 343 (1963) a process of preparing 2-phenacylbenzoxazole which comprises forming a benzoyl ketene acetal, reacting said benzoyl ketene acetal with an o-aminophenol and cyclizing the reaction product.

The object of this invention is to provide an essentially one-step process of preparing 2-phenacyloxazoles corresponding to the above formula in high yields. A further object of this invention is to provide an essentially one-step process of preparing 2-phenacylbenzoxazoles in high yields from commercially available material.

We have now found that the objects of our invention can be attained by condensing a 2-methyloxazole (e.g., 2-methylbenzoxazole or 2-methylnaphthoxazole) with an alkyl ester of an aromatic monocarboxylic acid using an alkali metal hydride catalyst. This process has provided the desired ketones in yields as high as 60 to 80 percent. This is quite surprising since attempts to condense 2-methylbenzoxazole with ethyl benzoate using a potassium ethoxide catalyst has provided 2-phenacylbenzoxazole in only about 20% of the theoretical yield.

Briefly our invention comprises condensing a 2-methyloxazole with an alkyl ester of an aromatic monocarboxylic acid in an inert diluent using a catalytic amount of an alkali metal hydride catalyst. The reaction is continued until the hydrogen evolved by the decomposition of the alkali metal hydride is completed.

Suitable 2-methyloxazoles of the benzene and naphthalene series utilizable in our invention include 2-methylbenzoxazole, 2,5,6-trimethylbenzoxazole, 2 - methyl - 5 - ethylbenzoxazole, 2-methyl-5-phenylbenzoxazole, 2-methyl-5-chlorobenzoxazole, 2 - methyl-4-bromobenzoxazole, 2-methyl-5-octylbenzoxazole, 2-methyl-naphth (2.3) oxazole, 2-methyl-naphth (2.1) oxazole, 2-methyl-naphth (1.2) oxazole, etc. Of these the commercially available 2 - methylbenzoxazole, 2,5,6 - trimethylbenzoxazole and 5-phenyl-2-methylbenzoxazole are preferred since these compounds are commercially available and are desirable starting materials for the preparation of dyes useful in photographic emulsions. As used herein the term "a 2-methylbenzoxazole" and "a 2-methylnaphthoxazole" include the corresponding unsubstituted and substituted oxazole containing innocuous, non-reactive substituents on the arylene ring, such as alkyl, halo (e.g., bromo or chloro), hydroxy, alkoxy (e.g., methoxy or ethoxy) which do not interfere with the claimed reaction. Accordingly compounds bearing these groups are deemed to be equivalents of the unsubstituted 2-methyloxazole of the benzene and naphthalene series.

Suitable alkyl esters of aromatic carboxylic acids include methyl benzoate, ethyl benzoate, ethyl (o, m, p) toluate, ethyl chloro (o, m, p) benzoate, propyl naphthoate, 2-ethylhexyl benzoate, ethyl-para-octylbenzoate, chloroethyl benzoate, etc. Of these the unsubstituted lower alkyl esters (e.g., methyl and ethyl) of benzoic acid are prefered because of the relatively low boiling point of the alcohol from which they are formed and the relatively low cost of these reagents. Generally speaking, the alcohol moiety of the aromatic ester is of little consequence since the alcohol moiety is not found in the final ketone product. Best results have been obtained when the alkyl ester of the aromatic carboxylic acid and 2-methyloxazole are used in essentially equal molar proportions (i.e., a concentration of about 0.5 to 2 moles per mole of 2-methyloxazole compound).

The catalysts utilizable in our invention comprise the alkali metal hydrides such as sodium hydride, potassium hydride, lithium hydride, rubidium hydride and cesium hydride. These catalsyts can be used in a concentration of about 0.5 to 5 moles per mole of 2-methyloxazole. As the concentration of the alkali metal hydride increases from about 1 to 2 moles per mole of 2-methyloxazole, the yield of the desired 2-phenacyloxazole increases from about 40 percent to as high as 70 to 80 percent. Accordingly, it is preferred to use the alkali metal hydride catalyst in a minimum concentration of 1 mole per mole of 2-methyloxazole. Concentrations materially above 2 moles of alkali metal hydride per mole of 2-methyloxazole do not materially increase the yields of the desired products.

Normally this reaction is carried out in one or more suitable inert anhydrous diluents such as benzene, toluene, o, m, p-xylene (mixtures of the various isomers thereof), cumene, etc. Other non-reactive diluents in addition to the aforementioned aromatic hydrocarbons include amides, such dimethyl formamide, diethyl acetamide, sulfoxides, such as dimethyl sulfoxide, etc. In general the aromatic hydrocarbon diluents are preferred because of their low cost and the high yield obtainable therewith.

The condensation can be carried out conveniently at temperatures of about 20 to 120° C. or higher. The maximum temperatures utilizable is generally dependent upon the boiling point of the diluent in which the reaction is carried out. If desired, pressure apparatus and higher temperatures can be utilized. However no advantages have been found in such techniques.

As indicated above, the 2-phenacyloxazoles of this invention are valuable dye intermediates.

The examples following are merely illustrative and should not be construed as limiting the scope of this invention.

Example I

This example illustrates the preparation of 2-phenacylbenzoxazole. Five hundred ml. dry toluene and 63.9 g. (1.3 M) of sodium hydride (50% oil dispersion) were placed in a clean dry 5-liter flask equipped with stirrer, reflux condenser, nitrogen inlet and outlet tubes. There was added under nitrogen a solution of 153.1 g. of 2-methylbenzoxazole (0.65 M) in 760 ml. dry toluene. The reaction mixture was heated to about 70° C. and a solution of 90 g. ethyl benzoate (0.65 M) in 127 ml. dry toluene was added dropwise while maintaining the reaction temperature at about 70° C. with heating and cooling as necessary. The addition required about 60 minutes. The yellow suspension was slowly brought to reflux and the evolution of hydrogen was steady for approximately two hours. The reaction mixture was cooled to 10° C., filtered, washed with dry ether and air dried. The resultant product was added to 300 ml. of 10% aqueous acetic acid, filtered, washed with water and dried. One hundred and twenty g. (74% of theoretical yield) of 2-phenacylbenzoxazole having a melting point of 89 to 90° C. was isolated. A portion of material which was recrystallized from methanol had a melting point of 90 to 91° C.

*Analysis.*—Calculated for $C_{16}H_{11}NO_2$. C, 75.92%; H, 4.68%; N, 5.90%. Found: C, 75.73, 75.85%; H, 4.77, 4.68%; N, 6.32, 6.35%.

*Example II*

This example illustrates the preparation of 2-phenacyl-5-phenylbenzoxazole. Example I was repeated using 0.133 M of 2-methyl-5-phenylbenzoxazole, 0.133 M of ethyl benzoate and 0.266 M of sodium hydride. Thirty-one grams of 5-phenyl-2-phenacylbenzoxazole (71% of the theoretical yield) having a melting point of 145 to 147° C. was obtained. After one recrystallization from methanol, the product had a melting point of 151 to 152° C.

*Analysis.*—Calculated for $C_{21}H_{15}NO_2$. C, 80.49%; H, 4.83%; N, 4.45%. Found: C, 80.60, 80.35%; H, 4.96, 4.80%; N. 4.49, 4.25%.

*Example III*

This example illustrates the preparation of 5,6-dimethyl-2-phenacylbenzoxazole. Twenty-one and four-tenths grams (0.133 M) of 2,5,6-trimethylbenzoxazole was dissolved in 50 ml. of dry toluene. The 2,5,6-trimethylbenzoxazole, 100 ml. dry toluene, and 12.8 g. (0.266 M) of sodium hydride (50% oil dispersion) were placed in a 500 ml. flask equipped with stirrer, reflux condenser and nitrogen inlet and outlet. This suspension was stirred and heated to about 65° C. Twenty grams (0.133 M) of ethyl benzoate in 50 ml. dry toluene was added rapidly dropwise while maintaining the reaction at about 65° C. After the addition was complete the reaction mixture was heated to reflux for about 3 hours until the evolution of hydrogen was completed. The yellow suspension was filtered, and washed with dry ether. The product was dispersed in 20% aqueous acetic acid, filtered and washed with water. Twenty and three-tenths grams of 5,6-dimethyl-2-phenacylbenzoxazole was obtained (58% of the theoretical yield) having a melting point of 150 to 151° C. after one recrystallization from methyl Cellosolve.

*Analysis.*—Calculated for $C_{17}H_{15}NO_2$. C, 76.95%; H, 5.69%; N, 5.27%. Found: C, 76.55, 76.73%; H, 5.82, 5.70%; N, 5.30, 5.23%.

Essentially the same results are obtained by replacing the ethyl benzoate with methyl benzoate, propyl p-toluate and ethyl alphanaphthoate. Essentially the same results are obtained by replacing the sodium hydride with potassium hydride.

*Example IV*

Example I was repeated except that the concentration of sodium hydride was cut in half. The yield of 2-phenacylbenzoxazole was reduced to about 40%.

*Example V*

Example I was repeated using dimethyl formamide as the diluent with essentially the same results except that the yield of 2-phenacylbenzoxazole was lower than in the process of Example I.

Variations and modifications can be made in the procedures, compositions and materials herein described without departing from the scope or spirit of this invention.

We claim:
1. The process of preparing 2-phenacyloxazoles which comprises reacting an alkyl ester of an aromatic carboxylic acid with a 2-methylaryleneoxazole in the presence of a catalytic amount of an alkali metal hydride catalyst.
2. The process of preparing 2-phenacyloxazoles which comprises reacting an alkyl ester of an aromatic monocarboxylic acid with a 2-methyloxazole selected from the group consisting of a 2-methylbenzoxazole and a 2-methylnaphthoxazole in the presence of a catalytic amount of an alkali metal hydride catalyst.
3. The process of claim 2 wherein said reaction is carried out in the presence of an inert diluent.
4. The process of preparing 2-phenacylbenzoxazoles which comprises reacting an alkyl ester of an aromatic monocarboxylic acid with a 2-methylbenzoxazole in an inert diluent in the presence of an alkali metal hydride catalyst, wherein said catalyst comprises at least one mole per each mole of 2-methylbenzoxazole.
5. The process of claim 4 wherein said inert diluent comprises an aromatic hydrocarbon.
6. The process of claim 4 wherein said alkyl ester of an aromatic monocarboxylic acid comprises a lower alkyl ester of benzoic acid.
7. The process of claim 4 wherein said 2-methylbenzoxazole comprises an unsubstituted 2-methylbenzoxazole.
8. The process of claim 4 wherein said 2-methylbenzoxazole comprises 2,5,6-trimethylbenzoxazole.
9. The process of claim 4 wherein said 2-methylbenzoxazole comprises 5-methyl-methylbenzoxazole.
10. The process of claim 4 wherein said reaction is carried out at a temperature of about 20 to 120° C.

References Cited

Elderfield, Heterocyclic Compounds, vol. 5 (1957), pp. 438–9.

Royals et al., J. Am. Chem. Soc., vol. 76 (1954), pp. 5452–5.

Weiss et al., J. Am. Chem. Soc., vol. 71 (1949), pp. 2023–6.

ALEX MAZEL, *Primary Examiner.*

R. J. GALLAGHER, *Assistant Examiner.*